(12) United States Patent
Lopyrev et al.

(10) Patent No.: US 9,141,656 B1
(45) Date of Patent: Sep. 22, 2015

(54) SEARCHING USING ACCESS CONTROLS

(75) Inventors: Mikhail Lopyrev, San Francisco, CA (US); Hein Roehrig, San Francisco, CA (US); Maureen Heymans, Los Altos Hills, CA (US); Matthew E. Kulick, San Francisco, CA (US)

(73) Assignee: Google Inc., Mountain View, CA (US)

( * ) Notice: Subject to any disclaimer, the term of this patent is extended or adjusted under 35 U.S.C. 154(b) by 440 days.

(21) Appl. No.: 13/604,861

(22) Filed: Sep. 6, 2012

Related U.S. Application Data

(60) Provisional application No. 61/531,190, filed on Sep. 6, 2011.

(51) Int. Cl.
*G06F 17/30* (2006.01)

(52) U.S. Cl.
CPC .............................. *G06F 17/30321* (2013.01)

(58) Field of Classification Search
CPC ................................................ G06F 17/30321
USPC ......................................................... 705/319
See application file for complete search history.

(56) References Cited

U.S. PATENT DOCUMENTS

| | | | |
|---|---|---|---|
| 7,856,449 B1 * | 12/2010 | Martino et al. | 707/784 |
| 7,877,781 B2 | 1/2011 | Lim | |
| 2005/0171955 A1 * | 8/2005 | Hull et al. | 707/10 |
| 2005/0198031 A1 * | 9/2005 | Pezaris et al. | 707/9 |
| 2006/0004707 A1 * | 1/2006 | Dettinger et al. | 707/3 |
| 2006/0004892 A1 * | 1/2006 | Lunt et al. | 707/204 |
| 2006/0042483 A1 * | 3/2006 | Work et al. | 101/91 |
| 2006/0206462 A1 | 9/2006 | Barber | |
| 2007/0203891 A1 * | 8/2007 | Solaro et al. | 707/3 |
| 2007/0208746 A1 | 9/2007 | Koide et al. | |
| 2007/0208751 A1 * | 9/2007 | Cowan et al. | 707/10 |
| 2007/0233672 A1 * | 10/2007 | Sanfacon et al. | 707/5 |
| 2007/0250486 A1 | 10/2007 | Liao et al. | |
| 2007/0260725 A1 * | 11/2007 | McCuller | 709/224 |
| 2008/0033954 A1 | 2/2008 | Brooks et al. | |
| 2008/0168135 A1 | 7/2008 | Redlich et al. | |
| 2008/0281793 A1 * | 11/2008 | Mathur | 707/3 |
| 2008/0294618 A1 * | 11/2008 | Hamilton et al. | 707/5 |
| 2009/0063448 A1 * | 3/2009 | DePue et al. | 707/5 |
| 2009/0106207 A1 | 4/2009 | Solheim et al. | |
| 2009/0106271 A1 | 4/2009 | Chieu et al. | |

(Continued)

OTHER PUBLICATIONS

Mislove, Alan, Krishna P. Gummadi, and Peter Druschel. "Exploiting social networks for internet search." 5th Workshop on Hot Topics in Networks (HotNets06). Citeseer. 2006.*

(Continued)

*Primary Examiner* — Neveen Abel Jalil
*Assistant Examiner* — Kristofer Biskeborn
(74) *Attorney, Agent, or Firm* — Fish & Richardson P.C.

(57) ABSTRACT

Techniques include: identifying one or more first entities who have connections to more than a threshold number of other entities; identifying first content in the search index that is authored by the first entities; and associating author restricts with the first content, where the author restricts include data identifying entities who authored corresponding content. The techniques may also include: identifying one or more second entities who have social connections to one or more entities who authored second content, where the one or more second entities have connections to less than the threshold number other entities; associating searcher restricts with the second content; and providing the search index updated with searcher and author restricts.

20 Claims, 8 Drawing Sheets

(56) References Cited

U.S. PATENT DOCUMENTS

| | | | |
|---|---|---|---|
| 2009/0228486 A1* | 9/2009 | Kuehr-McLaren et al. | 707/9 |
| 2009/0281988 A1* | 11/2009 | Yoo | 707/3 |
| 2009/0327232 A1* | 12/2009 | Carter et al. | 707/3 |
| 2010/0057772 A1* | 3/2010 | Manolescu et al. | 707/103 R |
| 2010/0153404 A1* | 6/2010 | Ghosh et al. | 707/748 |
| 2010/0174709 A1* | 7/2010 | Hansen et al. | 707/728 |
| 2010/0185611 A1 | 7/2010 | Liao et al. | |
| 2010/0274815 A1* | 10/2010 | Vanasco | 707/798 |
| 2010/0306249 A1* | 12/2010 | Hill et al. | 707/769 |
| 2010/0312724 A1* | 12/2010 | Pinckney et al. | 706/11 |
| 2011/0137932 A1* | 6/2011 | Wable | 707/769 |
| 2011/0153619 A1* | 6/2011 | Carter et al. | 707/748 |
| 2011/0161987 A1* | 6/2011 | Huang et al. | 719/318 |
| 2011/0167071 A1* | 7/2011 | Yang | 707/741 |
| 2011/0246439 A1* | 10/2011 | Isard et al. | 707/706 |
| 2011/0320441 A1* | 12/2011 | Lee et al. | 707/723 |
| 2012/0150971 A1* | 6/2012 | Bahrainwala et al. | 709/206 |

OTHER PUBLICATIONS

Carmel, David, et al. "Personalized social search based on the user's social network." Proceedings of the 18th ACM conference on Information and knowledge management. ACM, 2009.*

Bender, Matthias, et al. "Exploiting social relations for query expansion and result ranking." Data engineering workshop, 2008. ICDEW 2008. IEEE 24th International Conference on. IEEE, 2008.*

Biancalana, Claudio, and Alessandro Micarelli. "Social tagging in query expansion: A new way for personalized web search." Computational Science and Engineering, 2009. CSE'09. International Conference on. vol. 4. IEEE, 2009.*

* cited by examiner

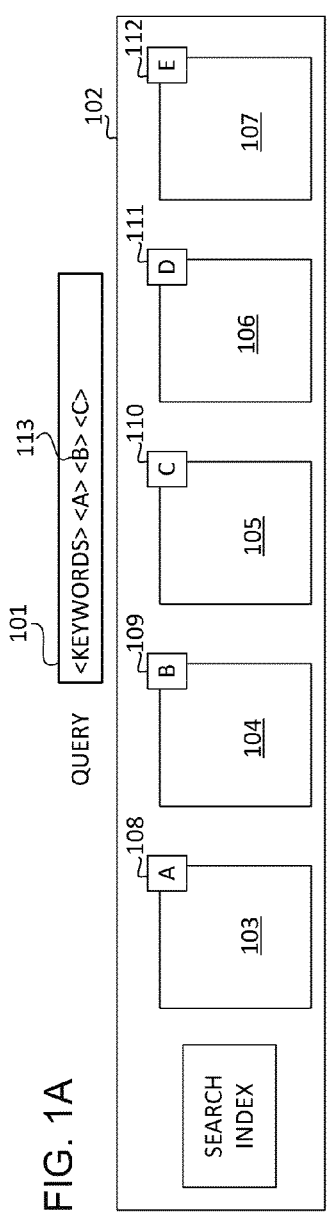
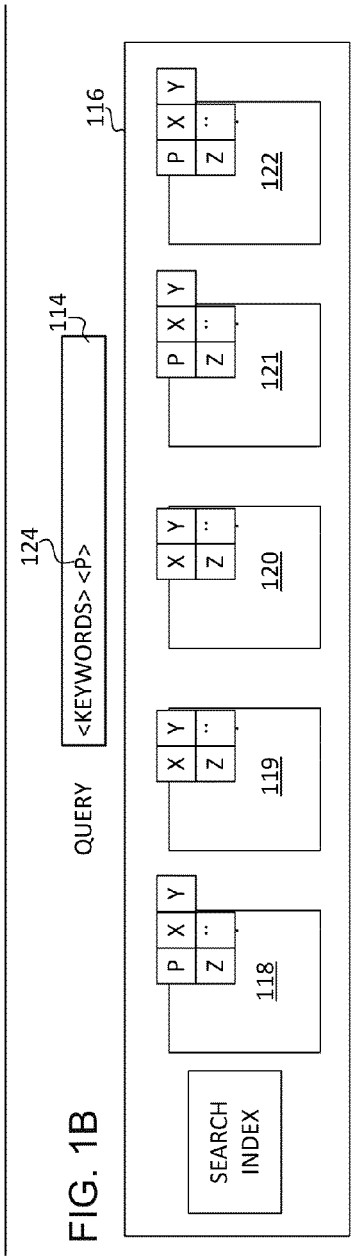
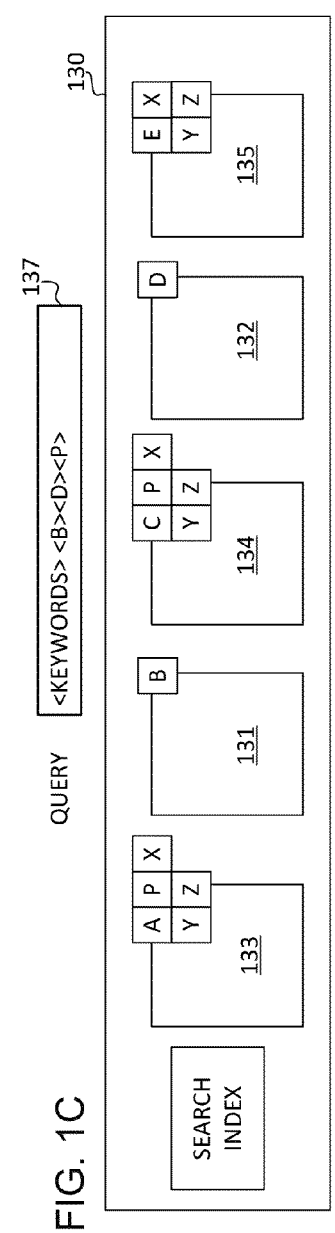

SEARCHING USING ACCESS CONTROLS

CROSS-REFERENCE TO RELATED APPLICATION

Priority is hereby claimed to U.S. Provisional Application No. 61/531,190, which was filed on Sep. 6, 2011. The contents of U.S. Provisional Application No. 61/531,190 are hereby incorporated by reference into this disclosure.

BACKGROUND

This specification relates generally to a data processing, particularly information retrieval using access controls.

Search engines identify resources (e.g., images, audio, video, World Wide Web (Web) pages, text, documents) that are relevant to a user's needs and present information about the resources in a manner that is useful to the user. A search engine may be used to conduct a search of a source of data, e.g., the Internet, a social network, an intranet, non-networked storage, and the like.

SUMMARY

Example techniques for searching using access controls may include the following operations: identifying one or more first entities who have connections, in one or more corresponding social graphs, to more than a threshold number of other entities; identifying first content in the search index that is authored by the first entities; and associating author restricts with the first content, where the author restricts include data identifying entities who authored corresponding content. The example techniques may also include the following operations: identifying one or more second entities who have social connections, in one or more corresponding social graphs, to one or more entities who authored second content, where the one or more second entities have connections to less than the threshold number other entities; associating searcher restricts with the second content, where the searcher restricts include data identifying the one or more second entities, and where the first content is not associated with searcher restricts; and providing the search index updated with searcher and author restricts. The example techniques may include one or more of the following example features, either alone or in combination.

The above operations may include one or more of the following: associating author restricts with at least some of the second content; identifying a newly-created association between two entities, where a first of the two entities is associated with second content that is associated with an author restrict for the first of the two entities; issuing, to a second of the two entities, the author restrict for the first of the two entities; and updating the search index to associate a searcher restrict for the second of the two entities with content authored by the first of the two entities. The author restrict for the first of the two entities may be used in searching for a predefined period of time. In some examples, at maximum, the predefined period of time may be the time between updates of the search index.

The search index may be used to identify content that is relevant to a search query. This may include: obtaining a search query that includes an author restrict and a searcher restrict; matching the author restrict to a corresponding author restrict associated with content in the search index, and matching the searcher restrict to a corresponding searcher restrict associated with content in the search index; and retrieving, from the search index, content in the search index that is associated with the corresponding author restrict, and content in the search index that is associated with the corresponding searcher restrict.

The above operations may include updating the search index periodically to incorporate, into the search index, content that has been identified since the search index was last updated. The content that has been identified since the search index was last updated may be associated with searcher restricts.

Advantages of employing author restricts and searcher restricts as described in the examples above may include, e.g., reducing the amount of information incorporated into a search query or the amount of information contained a search index. As a result, the amount of search performance degradation resulting from the size of search queries and indexes can be reduced.

The systems and techniques described herein, or portions thereof, may be implemented as a computer program product that includes instructions that are stored on one or more non-transitory machine-readable storage media, and that are executable on one or more processing devices. The systems and techniques described herein, or portions thereof, may be implemented as an apparatus, method, or electronic system that may include one or more processing devices and memory to store executable instructions to implement the stated functions.

The details of one or more implementations are set forth in the accompanying drawings and the description below. Other features, objects, and advantages will be apparent from the description and drawings, and from the claims.

BRIEF DESCRIPTION OF THE DRAWINGS

FIG. 1A is a diagram that shows, conceptually, an example search system that includes author restricts in a search index.

FIG. 1B is a diagram that shows, conceptually, an example search system that includes searcher restricts in the search index.

FIG. 1C is a diagram that shows, conceptually, an example search system that includes author restricts and searcher restricts in the search index.

Like reference symbols in the various drawings indicate like elements.

DETAILED DESCRIPTION

Figure 2:
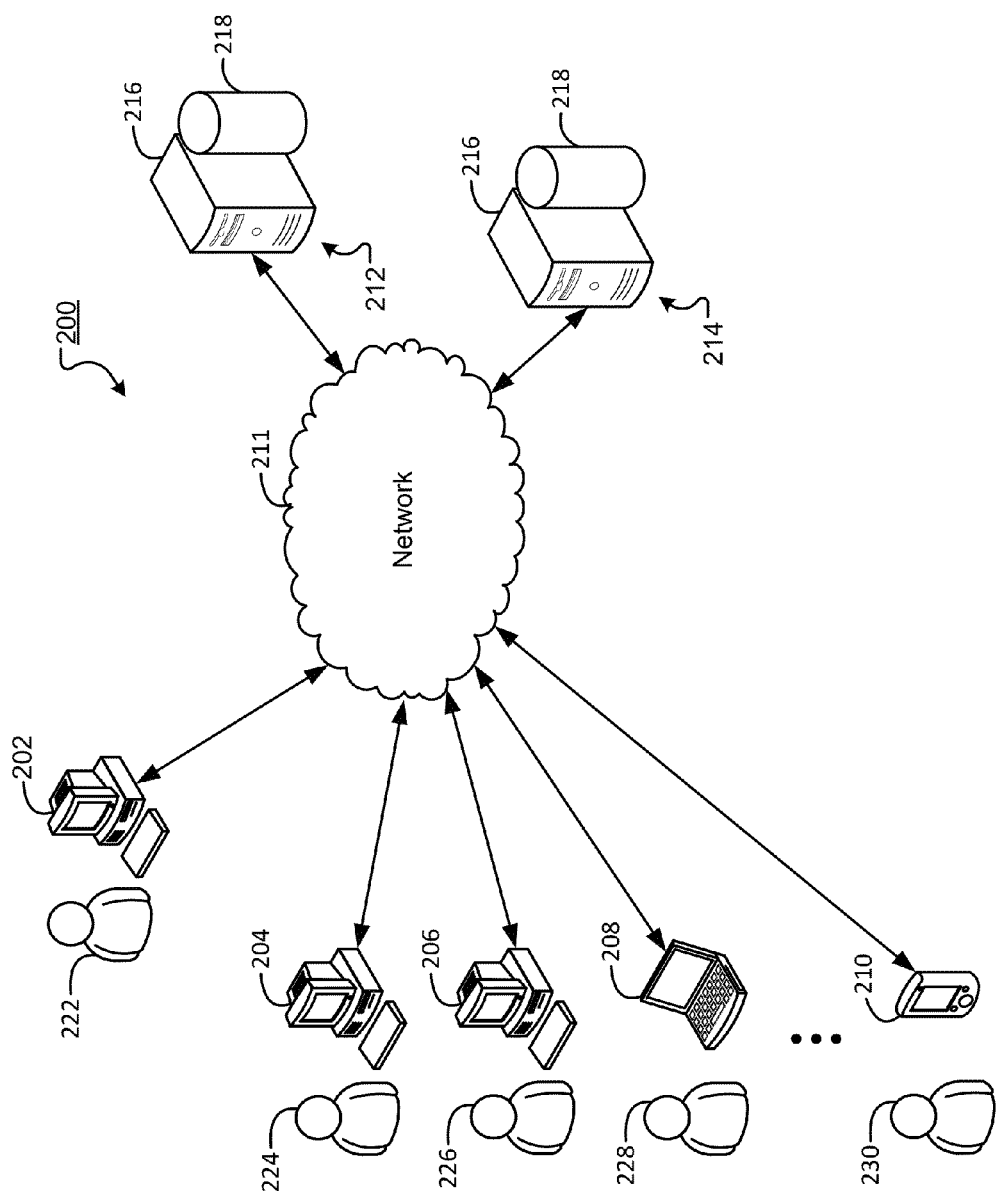
FIG. 2 is a block diagram showing an example of a network environment on which the process described herein may be implemented.

In a search context, a restrict includes data that associates a property, e.g., authorship or interest, to content in a search index. When a user conducts an online search, one or more restricts are incorporated into the search query. A search engine matches restrict(s) in the search query to restrict(s) associated with content in the search index. When a match is found, the content is deemed relevant to the search. The processes described herein associate electronic content (or simply "content") with restricts in a manner that can reduce the number of restricts that are passed in a search query, and that can reduce the number of restricts that are associated with content in a search index. The example implementations described herein perform the association by tagging; however, other appropriate types of associations may be used instead of tagging.

The processes described herein generate, and use, a modified search index to facilitate searching content, including, e.g., content from the Web, content from other network(s), content from an online social networking service, and content from other network or and non-network storage. The search index is "modified" in the sense that it contains content tagged with author restricts and content tagged with searcher restricts. Generally, an author restrict identifies authorship or other type of ownership (e.g., who uploaded the content) of a corresponding content. By way of example, an author can include a creator, a publisher, an entity responsible for disseminating content, or an entity claiming content by linking the content to their profile or account. Generally, a searcher restrict identifies content that an entity (e.g., a person, a company, a service, etc.) is deemed to be interested in, e.g., because the entity has online social connection(s) to authors of that content. The online social connections may be within the confines of the social networking service or outside the confines of the social networking service. By way example, a member of a social networking service may be interested in Web content authored by contacts of that member.

An author restrict for content may be generated, e.g., based on metadata associated with that content, or from other appropriate public and private sources with the author's permission. Authors may not permit tagging of associated content, and may not permit use of their private information.

FIG. 1A is a diagram that shows, conceptually, an example search system that includes author restricts in a search index. FIG. 1A illustrates an example where author restricts are used in a search query 101 and a search index 102 of a social networking service. As shown in FIG. 1A, content 103 to 107 in search index 102 is tagged with corresponding author restricts 108 to 112 (labeled A, B, C, D, E). Each author restrict identifies an online social connection who authored the corresponding content (e.g., author "A" created content 103). Author restricts for an online social connections are provided periodically. For example, each time search index 102 refreshes (e.g., the search index is updated to include new information), appropriate restricts are issued to the user (e.g., the restricts are associated with the user's online profile).

In FIG. 1A, a user is connected, on their social graph, to at least some entities who authored content 103 to 107. Accordingly, when that user conducts a search, the user may be interested in content from entities that the user is connected to socially. Therefore, when a search query is issued for that user, author restricts for one or more of the user's social connections are incorporated into the search query. These author restricts in the search query are matched to corresponding author restricts in the search index 102 to identify documents in the search index that are authored by entities associated with the user, e.g., in the user's social graph.

In the example of FIG. 1A, the search query 101 includes author restricts for entities A, B and C 113 because users A, B and C are on the searcher's social graph. Author restricts are not transmitted for entities D and E because entities D and E are not on the searcher's social graph. The author restricts A, B and C in the search query are matched to corresponding author restricts A for content 103, B for content 104, and C for content 105, thereby identifying content 103 to 105 as containing content that the searcher might be interested in.

By employing author restricts in the manner described with respect to FIG. 1A, the amount of information stored in search index 102 can be reduced. That is, content is tagged with an author restrict, which may be a small amount of data relative to the amount of data associated with the search query, which may include author restricts for a number of entities associated with the user.

FIG. 1B is a diagram that shows, conceptually, an example search system that includes searcher restricts in the search index. FIG. 1B illustrates an example where searcher restricts are used in the search query 114 and the search index 116. As shown in FIG. 1B, content 118 to 122 in search index 116 is tagged with corresponding searcher restricts (labeled P, X, Y, Z . . . ). In this example, restrict "P" is the restrict that identifies the user performing a search.

A searcher restrict is data that identifies content in the search index that is deemed of interest to the searcher because the searcher is connected, socially, to author(s) of that content. More specifically, a user may be more interested in content from their contacts or other social connections than other content with no such associations. That content is identified by associating, with each appropriate content item, a searcher restrict of each person who might be interested in that content. So, for example, content 118 is tagged with a searcher restrict P (for user P) because user P is associated, e.g., on a social graph, with the author of content 118; content 119 is tagged with a searcher restrict X (for user X) because user X is associated, e.g., on a social graph, with the author of content 119; content 120 is tagged with a searcher restrict Y (for user Y) because user Y is associated, e.g., on a social graph, with the author of content 120; and so forth. As shown, each content item may contain more than one searcher restrict. Searcher restricts for online social connections may be provided periodically; e.g., to the user's online profile each time the search index refreshes.

In FIG. 1B, a user of the social networking service is connected, on their social graph, to at least some of the entities who authored content 118 to 122. Accordingly, when that user conducts a search, the user may be interested in content from entities to which the author is connected socially. Therefore, when a search query issues for that user, the search query contains a searcher restrict, here P, for the user. The searcher restrict P 124 in the search query is matched to a corresponding searcher restrict P for content 118, 121 and 122, thereby identifying content 118, 121 and 122 as being something that the user might be interested in and, therefore, that would be retrieved in a search. Content tagged with searcher restricts may be ranked or scored higher than other content retrieved by the search. Content 119 and 120 does not contain the searcher restrict P. This is because user P is not connected to the authors of that content socially and, therefore, may be less interested in their content.

By employing searcher restricts in the manner described with respect to FIG. 1B, the amount of information contained in the search query can be kept relatively low. That is, the searcher restrict is a relatively small amount of data, which is sent with each search query. This relatively small amount of data can be used to identify content items in the search index, as described above. By contrast, the search index can become quite large. For example, if a user is connected, socially, to millions of entities, that user's content in the search index is associated with millions of restricts. Each item content, no matter how small, may be associated with appropriate restricts. This can be particularly problematic, e.g., for members of a social network who have a lot of associations. For example, a celebrity on a social network may have millions of followers. In the process described with respect to FIG. 1B, every content item authored by that celebrity, no matter how small (e.g., a microblog post or text message), will be associated with millions of searcher restricts—one restrict for each of that celebrity's associations (followers, contacts, etc.) on the social network.

FIG. 1C is a diagram that shows, conceptually, an example search system that includes author restricts and searcher restricts in the search index. FIG. 1C shows an approach that combines features shown in FIGS. 1A and 1B. The example of FIG. 1C employs a modified search index, searcher restricts, and author restricts as follows. Entities (e.g., members of a social networking service) who have more than a specified number of associations (e.g., more than a specified number of contacts, followers, etc.) are identified. Content in the search index 130 associated with such entities is tagged with author restricts, but not searcher restricts. So, in the example of FIG. 1C, the authors of content 131 and 132 contain more than the specified number of associations. Accordingly, that content is tagged with author restricts (B and D, respectively), but not the searcher restricts of entities who are associated with those authors. By contrast, the authors of content 133, 134 and 135 do not have more than the specified number of associations. Accordingly, that content is tagged with searcher restricts for associated entities (e.g., P, X, Y, Z . . . ). That content 133, 134 and 135 may also be tagged with author restricts (e.g., A, B, C, etc. as shown) as explained below.

The searcher restrict for a particular user, along with appropriate author restricts, may be issued to the user's online profile, e.g., when the search index refreshes. When a search is initiated, the search query 137 contains the searcher restrict (here P) and author restricts (here B and D) for entities who are associated socially with the user and who have more than the specified number of associations. In the search index 130, both the searcher and author restricts are used to identify content that might be of interest to the user: the author restrict by reference to the author of such content, and the searcher restrict by reference to the searcher who might be interested in such content. So, in the example of FIG. 1C, the author restricts B and D are used to identify content 131 and 132, respectively, and the searcher restrict P is used to identify content 133 and 134. Content 135 is not tagged with the author restricts B or D, nor is it tagged with searcher restrict P. Accordingly, content 135 is not identified in response to search query 137.

By employing author restricts and searcher restricts in the manner described with respect to FIG. 1C, the amount of information passed in the search query and the amount of information contained the search index can be regulated. As a result, the amount of search performance degradation resulting from the size of search queries and indexes can be reduced.

As noted above, in some examples, each content item in the search index may be tagged with an appropriate author restrict. An author restrict may be used to search on newly-created social connections before the search index is refreshed to reflect those newly-created social connections. A newly-created social connection may be, e.g., a social connection that is made between index updates, for example. By way of example, referring to FIG. 1C, in this case, user P makes a social connection to entity E, where no connection previously existed. Content 135 (authored by entity E) does not initially contain the searcher restrict for user P, nor does entity E have more than the specified number of associations that would trigger search queries to require entity E's author restrict. Consequently, if user P conducts a search of index 130 strictly in the manner prescribed by FIG. 1C (e.g., by searcher restrict and author restricts only for entities with large associations), and that search is conducted before the search index is updated to associate user P's restrict with content 135 of entity E, the resulting search may not identify user content 135.

To address this situation, in response to a new social connection between P and E, user P is provided with the author restrict for entity E. Since user P has entity E's author restrict, and since the search system knows that the connection between P and E is new (e.g., it did not exist before and is not currently present in the search index), the search system incorporates entity E's author restrict into a search query initiated for user P. In this case, entity E's author restrict will identify content 135 in the search. In this example, user P includes entity E's author restrict in his search queries, e.g., until the search index refreshes to reflect the association between P and E. For example, when providing user P with entity E's author restrict, the search system may indicate that entity E's author restrict is only valid for user P's searching for a period of time. A maximum period of time may be the time between index refreshes. By putting a time limit on the amount of time that an author restrict is valid for a searcher, the search system is able to dynamically manage the size of user search queries, while still maintaining a level of accuracy in the searching.

In some examples, negative restricts can be incorporated into a search index to filter-out content from people who have been disconnected from a searcher. These negative restricts can be incorporated into the search query before the searcher restricts and author restricts are updated. When negative restricts match corresponding "positive" restricts (e.g., searcher restricts) in the index, the content corresponding to those positive restricts is determined as not likely to be of interest. In this case, for example, that content may be removed as a candidate for inclusion in the search results or, if included, the ranking score for that content may be reduced.

In the example of FIG. 1C, content 131 and 132 each may be tagged with additional restricts (not shown). In some examples, content, e.g., 131 and 132, that are tagged with author restricts need not be tagged with searcher restricts. In other examples, such content 131 and 132 may be tagged with a limited number of searcher restricts, but not with the searcher restricts that would be required by the approach shown in FIG. 1B.

The modified approach described above with respect to FIG. 1C may be implemented in an appropriate network environment, with appropriate devices and computing equipment. An example of such an environment is described below.

FIG. 2 is a block diagram showing an example of a network environment 200 on which the process described herein may be implemented. The network environment 200 includes computing devices 202, 204, 206, 208, 210 that can each communicate with a first server system 212 and/or a second server system 214 over a network 211. Each of computing devices 202, 204, 206, 208, 210 has a respective user 222, 224, 226, 228, 230 associated therewith. Each of the first and second server systems 212, 214 includes a computing device 216 and a machine-readable repository, or database 218. Example environment 200 may include many thousands of Web sites, computing devices and servers, which are not shown.

The network 211 can include a large computer network, examples of which include a local area network (LAN), wide area network (WAN), the Internet, a cellular network, or a combination thereof connecting a number of mobile computing devices, fixed computing devices, and server systems. The network(s) may provide for communications under various modes or protocols, examples of which include Transmission Control Protocol/Internet Protocol (TCP/IP), Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, or General Packet Radio System (GPRS), among others. Communication may occur through a radio-frequency transceiver. In addition, short-range communication may occur, e.g., using a Bluetooth, WiFi, or other such transceiver.

Computing devices 202 to 210 enable respective users 222 to 230 to access and to view content, e.g., Web pages included in Web sites. For example, user 222 of computing device 202 can view a Web page using a Web browser. The Web page can be provided to computing device(s) 202 to 210 by server system 212, server system 214 or another server system (not shown). In example environment 200, computing devices 202, 204, 206 are illustrated as desktop-type computing devices, computing device 208 is illustrated as a laptop-type computing device 208, and computing device 210 is illustrated as a mobile computing device. It is appreciated, however, that computing devices 202 to 210 can each include a type of computing device, e.g., a desktop computer, a laptop computer, a handheld computer, a personal digital assistant (PDA), a cellular telephone, a network appliance, a camera, a smart phone, an enhanced general packet radio service (EG-PRS) mobile phone, a media player, a navigation device, an email device, a game console, or a combination of two or more of these data processing devices or other appropriate data processing devices. In some implementations, a computing device can be included as part of a motor vehicle (e.g., an automobile, an emergency vehicle (e.g., fire truck, ambulance), a bus).

Figure 3:
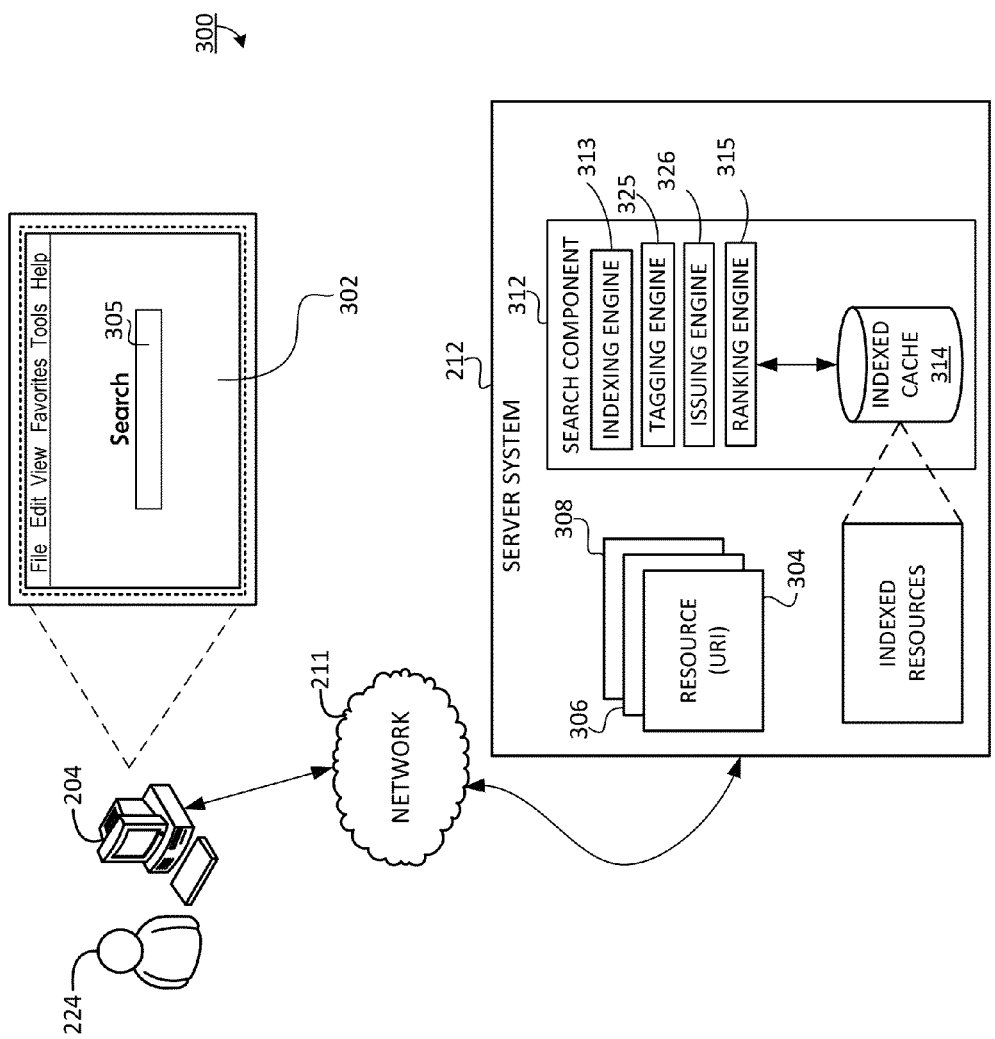
FIG. 3 a block diagram of an example part of the network environment of FIG. 2.

FIG. 3 a block diagram of an example part 300 of the network environment of FIG. 2. In FIG. 3, computing device 204 communicates with server system 212 to display a Web page 302 of a Web site. In this regard, server system 212 stores a plurality of resources 304, 306, 308, each having an associated resource identifier (Resource ID). For example, the resource 304, 306, 308 can each correspond to Web pages from the Web and a social networking service or other content.

To view a Web page, user 224 can input or select a Resource ID using a browser that is executed on computing device 204. The Resource ID can include, for example, a uniform resource indicator (URI) or a uniform resource locator (URL). A request including the Resource ID is transmitted from computing device 204 to server system 212 over network 211. In response, the server system identifies the requested resource based on the Resource ID, and transmits the resource to computing device 204 over network 211. For example, the resource may be a Web page, through which a user may access a search component 312. The Web page may include a field 305 for inputting search terms that are transmitted to the search component. In response, the search component performs a search of an indexed cache, and returns a search results list to a user. The search results list may include, e.g., links to content that is relevant to the search terms.

Search component 312 identifies resources, e.g., on the Web or in the social networking site, and crawls and indexes those resources. In this regard, the search component may include an indexing engine 313 that indexes resources, including, e.g., Web pages, files, content posts, messages, blogs, and the like, and that stores the indexed resources in indexed cache 314. Appropriate information from an entity's social graphs may be included in the indexed cache. A ranking engine 315 (or other software) ranks the resources based on criteria, e.g., popularity. Indexed cache 314 may also include an access control list (ACL). Generally, an ACL includes a listing of entities (e.g., members or non-members of a social networking service) that are authorized to access an item of content.

The search may be implemented, e.g., on server system 212 as shown or on other appropriate hardware. In response to an input, the search component can access indexed cache 314 to identify resources that are relevant to the input. Ranking engine 315 ranks the identified resources based, e.g., on popularity or other appropriate criteria.

A social graph is one way to represent connection between two entities, which may, or may not, be on the same social networking service. In this regard, an entity can be, e.g., a person, a company, a service, or any other party to which a social connection can be made. A social graph is an association of connections among users and content, which may be depicted graphically. Types of connections in social graphs can include, but are not limited to, other users to which a user is in direct contact (e.g., user mail or chat contact, direct contacts on social sites) and users to which the user is in indirect contact (e.g., contacts of contacts, connections of users that have a direct connection to the user). In some implementations, a social graph includes content generated by individuals (e.g., blog posts, reviews) as connections to the user. In some examples, a direct connection may be unilateral or bilateral. The social graph can include connections within a single network or across multiple networks.

Distinct social graphs can be generated for different types of connections. For example, a user can be connected with chat contacts in one social graph, email contacts in a second social graph, and connections from a particular social network in a third social graph. Each social graph can include edges to additional entities at higher degrees of separation from the user. For example, an email contact can have its own email contacts to others adding a degree of separation from the user (e.g., user→email contact→contact of email contact). These contacts can, in turn, can have additional contacts at another degree of separation from the user. Similarly, an entity's connection to someone in a particular social network can be used to identify additional connections based on that person's connections. Distinct social graphs can include edges connecting one or more social graph to one or more other social graphs. Thus, a social graph can include a single social graph or multiple interconnected social graphs.

Affinity between members of a social graph can be represented by edges, e.g., in a database that stores data for the social graph. These edges can be weighted, either in that database or elsewhere, to reflect a level of affinity between two entities connected in the social graph. Affinity between entities can be content specific. For example, social graph data may identify specific types of content associated with an edge between entities and specific affinities for that content. For example, the social graph data may specify that, between two connected entities, the first entity has a first level of affinity for the second entity's videos and a second, different level of affinity for the second entity's written work. Similarly, the social graph may specify that the second entity has a third, different level of affinity for the first entity's blogs.

Figure 4:
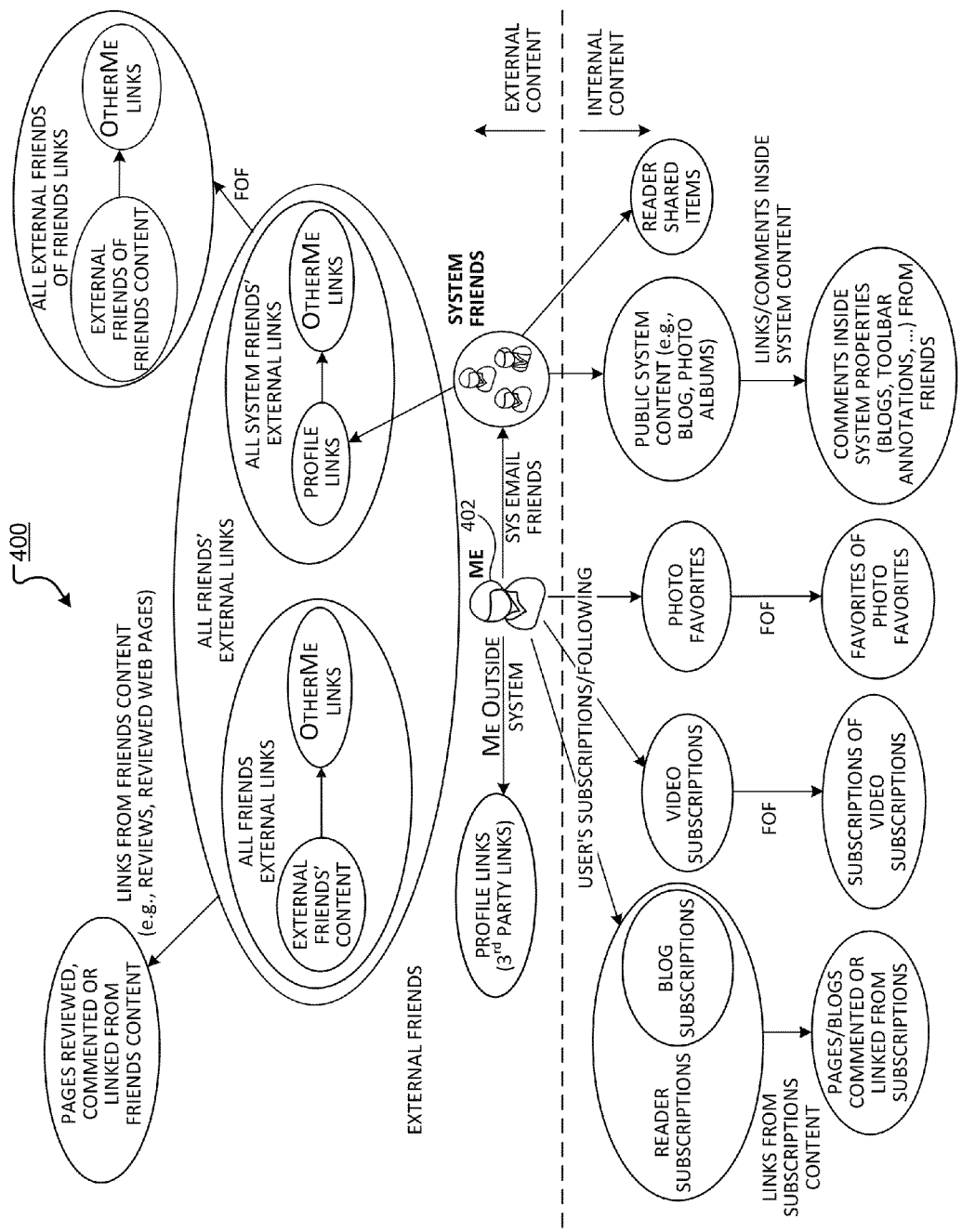
FIG. 4 is a conceptual view of an example of a social graph.

FIG. 4 is a conceptual view of an example of a social graph. In this regard, FIG. 4 shows sources of information for a social graph. In this example, a user's social graph is a collection of connections (e.g., users, resources, etc.) identified as having a relationship to the user 402 within some degree of separation. The user's social graph can include people and particular content at different degrees of separation. For example, the social graph of a user can include contacts, contacts of contacts (e.g., as defined by a user, social graphing site, or other metric), the user's social circle, people followed by the user (e.g., subscribed blogs, feeds, or Web sites), co-workers, and other specifically identified content of interest to the user (e.g., particular Web sites).

Diagram 400 shows that it is possible to extend the user's social graph to people and content both within a system and across one or more external networks. For example, the user can have a profile or contacts list that includes a set of identified contacts, a set of links to external resources (e.g., Web pages), and subscriptions to content of a system (e.g., a system that provides various content and applications including e-mail, chat, video, photo albums, feeds, or blogs). Likewise, blogs that include links to a user's contacts may be part of the user's social graph. Each of these groups can be connected to other users or resources at another degree of separation from the user. For example, contacts of the user each may have their own profile that includes links to resources as well as contacts of the respective contacts. In another example, a user may be connected to a social networking account. That social networking account may reference an article in a newspaper. A social connection, therefore, may be established between the user and the author of the article.

The connections to a user within a specified number of degrees of separation can be considered the social graph of the user. Membership and degree of separation in the social graph may be based on other factors, including a frequency of interaction. For example, a frequency of interaction by the user may be, e.g., how often the user visits a particular social networking site, or type of interaction may be, e.g., endorsing, selecting, or not selecting items associated with contacts. As interaction changes, the relationship of a particular contact in the social graph can also dynamically change. Thus, the social graph can be dynamic rather than static.

Members of a social networking service or others can designate particular resources as endorsed, claim resources, share resources, quote URLs, or otherwise indicate an interest or liking of content, e.g., a particular resource, Web page, or search result. For example, an application, widget, or scripting can be provided in search results pages, Web pages, or within a browser application that allows a user to indicate liking, sharing, or other evaluation of an associated resource or search result. The user can mark the particular resource, Web site, or search results to indicate endorsement or other evaluation (e.g., though a browser control or user interface element presented with the associated content). These types of information may also be reflected in members' social graphs.

A searcher may be more interested in content from others that are part of the user's social graph. For example, a user may be interested in reviews, opinions, or other content created or uploaded by members of the user's social graph. A search index may be annotated to facilitate search and retrieval of content from connected members.

Figure 5:
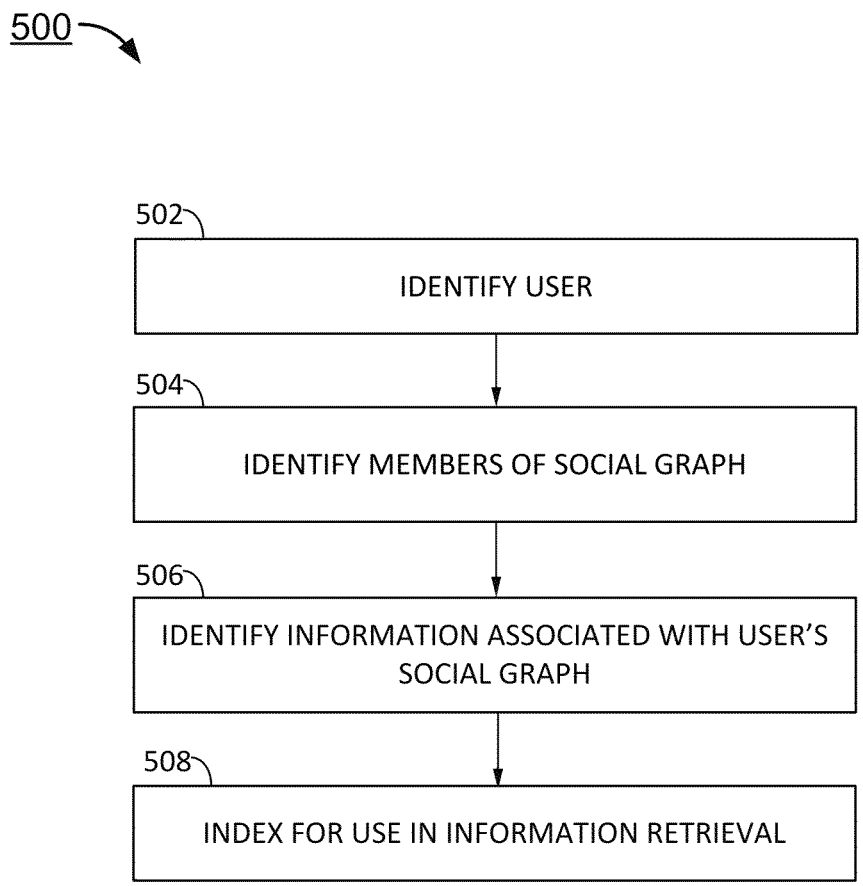
FIG. 5 is a flowchart showing an example of a process for creating and indexing a social graph.
Figure 6:
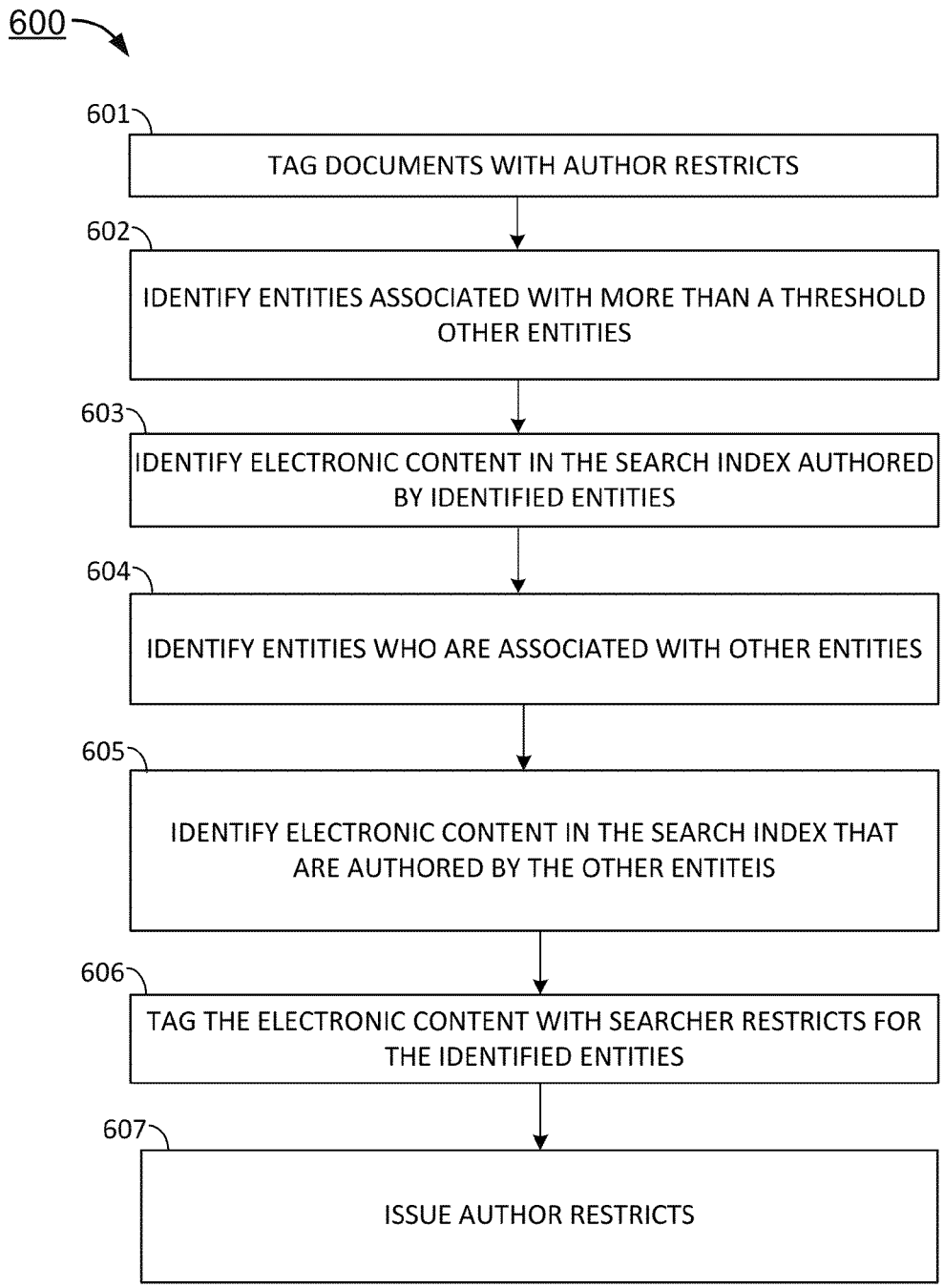
FIG. 6 is a flowchart showing an example of a process for creating a search index that includes author and searcher restricts.
Figure 7:
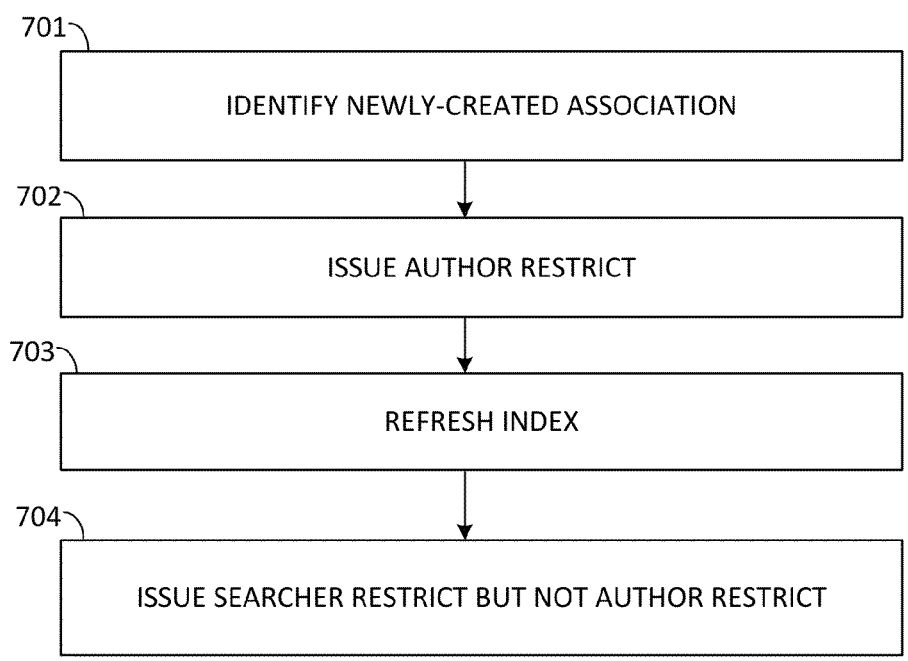
FIG. 7 is a flowchart showing an example of a process for using an author restrict in searching on newly-created social connections.

FIG. 5 is a flowchart showing an example of a process 500 for creating and indexing a social graph. Likewise, process 500 may be used to update/refresh the user's social graph in the indexed cache 314. Process 500 may be performed on an on-going basis by a dedicated engine in search system 312, e.g., before, or concurrent with, process 600 (FIG. 6 below) and process 700 (FIG. 7 below).

Process 500 identifies (502) a user. The user can be identified, for example, based on a profile associated with the user. The profile can be accessed, e.g., by referencing a username, email address, or other identifier. This information may be obtained using a login or other appropriate process.

Process 500 obtains (e.g., with the user's permission) information that is used to construct the user's social graph. In this example, the user's social graph identifies people and resources associated with the user, e.g., in which the user an interest. In some implementations, the social graph is limited to a specified number of degrees of separation from the user or to particular relationships or types of interaction with the user. In some implementations, the user's social graph may be generated by another system and provided upon request.

Referring to FIG. 5, process 500 identifies (504) members of the user's social graph. The user's social graph may be constructed using user profile data, e.g., by extracting relevant information from users and resources identified in the user profile data. For example, a user's profile can include a list of the user's contacts. The user's contacts can include contacts within a system (e.g., using a same e-mail or chat service that is affiliated with system) or external to the system (e.g., social graphs or a list of contacts associated with third party applications or service providers). The profile can also include a list of subscriptions to which the user belongs (e.g., identifying content that the user follows, for example, particular blogs or feeds), from which members of the user's social graph can be inferred.

The user's profile can also identify aliases used by the user (e.g., as associated with particular content providers or social graph sources). For example, a user may have a first identity for a chat application and a second identity for a restaurant review Web site. These two identities can be connected in order to unify online content associated with that user.

A user can prevent addition of members to the user's social graph, e.g., using an option or by keeping contacts out of particular groups used by process 500 to generate the social graph. In some other implementations, privacy features provide a user with an option to allow or to prevent, respectively, being included (or removed if already included) as a member of another's social graph. Thus, users can have control over what personal information or connection information, if any, is included in their social graphs.

Process 500 identifies (508) information associated with the user's social graph. Identified information associated with the user's social graph can include, for example, content or posting to resources subscribed to by the user (e.g., blogs). The identified information can also include content generated by members of the user's social graph. For example, members of a user's social graph can generate content including, for example, local reviews (e.g., for restaurants or services), video reviews and ratings, product reviews, book reviews, blog comments, news comments, maps, public Web annotations, public content, streaming updates, photos and photo albums. Thus, the content can include both content generated by members of the user's social graph, and content endorsed, reviewed or annotated by members of the user's social graph. The user's profile can also include external links identified by the user. These links can identify particular content of interest.

The social graph can be expanded by extracting information from identified people and content in the user's profile. For example, public profile information from social networking services can exist for identified contacts, from which information can be extracted (e.g., their contacts, links, and subscriptions). In some implementations, the user can adjust the members of their social graph directly. For example, the user can group their contacts (e.g., e-mail contacts) into groups accessed by process 500 in building the user's social graph.

Process 500 indexes (508) the identified social graph information for use in information retrieval. The social graph information may be part of a database in the indexed cache 314 of FIG. 3 or indexed separately from the indexed cache 314. By way of example, the index can be searched in response to a received search query to identify relevant search results associated with members of the user's social graph. For example, a search system can receive a query and identify both general search results as well as search results based on the indexed social graph information. The indexed social graph information may be updated (refreshed) intermittently or periodically, for example, to include recently added information associated with the user's social graph. For example, the indexed social graph information may be refreshed periodically (e.g., every day) to reflect new connections made between entities.

The indexing process (508) includes adding appropriate author and/or search restricts to content in the search index. Operations that may be included in the indexing process (508) are shown in FIG. 6 (process 600). Process 600 may be performed by tagging engine 325 (FIG. 3).

More specifically, indexing includes inspecting the ACLs of indexed content to determine which users can search for, and view, the content. Generally speaking, authors of content is permitted to access and view that content. As noted, an author may be an entity who created the content, shared the content, uploaded the content, claimed the content, and so forth. Process 600 may identify an author of content by metadata associated with the content. Process 600 tags (601) content in the index with corresponding author restricts. In some implementations, each item of content in the search index is tagged with an author restrict. In other implementations, this need not be the case. In this regard, although "tagging" is described in this example, in other examples different type of associations (other than tagging) may be made between content and restricts. For example, pointers or database tables may be used to associate content and restricts.

Process 600 identifies (602) entities who are associated with more than a specified (e.g., threshold) number of other entities. The threshold may be set in the indexing engine to an appropriate number, e.g., five thousand, one hundred thousand, a million. Process 600 identifies (603) content that is authored by entities who are associated with more than the threshold number of other entities. This content need not be tagged with the searcher restricts described below.

Process 600 identifies (604) connections among entities by reference to their social graph. In other words, process 600 identifies entities who are associated with other entities (either through a social networking service or outside the confines of the social networking service). By way of example, process 600 may identify that an entity M is connected to (e.g., a contact of) an entity N on a social networking service. Accordingly, the search system determines that when M conducts a search, that M will be interested in content that is authored by N. The connections may be identified by reference to an index or other database containing information that represents the entities' social graphs.

Process 600 identifies (605) content that is authored by associated entities. In the example used above, process 600 identifies, from an index of network content, content that is authored by entity N. This content may be, e.g., content that is publicly accessible (e.g., Web pages), content from the social networking service, and private content that may not be publicly available, but that is nevertheless accessible to entity M (e.g., with N's permission). Content accessibility may be defined in the ACL, and this information may be taken into account during indexing.

In operation 605, process 600 does not include, in the identified (605) content, content identified (603) above that was authored by entities with more than the threshold number of associations. This is because, in this implementation, that content (from 603) need not be tagged with searcher restricts.

Process 600 tags (606) the identified (605) content with searcher restricts. So, in the example above, content authored by entity N is tagged with M's searcher restrict, thereby enabling a search query issued by entity M and containing M's searcher restrict to identify N's content.

Process 600 issues (607) author restricts to each entity whose social graph is known, and who is associated with other(s) who have more than the threshold number of associations. Thus, appropriate author restrict(s) can be incorporated into each such entity's search queries. Each such entity is also issued a searcher restrict. Restricts may be issued, e.g., at time intervals. In an example, a searcher restrict is issued each time the search index refreshes.

The results of process 600 produce an index, an example of which is shown above in FIG. 1C, containing both searcher and author restricts.

FIG. 7 is a flowchart showing an example of a process for using an author restrict in searching on newly-created social connections. In this regard, FIG. 7 shows a process 700 for using an author restrict in searching on newly-created social connections. Process 700 may be part of the indexing process (508) performed above, or it may be executed in other appropriate hardware that hosts the social networking service. In this example, process 700 is performed by issuing engine 326 (FIG. 3).

Process 700 identifies (701) a newly-created association in a social graph. For example, one member of a social networking service may create an association with another member. The resulting association information is stored in a database, and is accessed by process 700 to identify the new association. In some implementations, in response to this newly-created association, process 700 identifies the entities to the association and issues (702), to each entity, an author restrict for content authored by the other entity. By way of example, in this case, entity M makes a social connection to entity N on a social networking service. In this example, entity N does not have more than the threshold number of followers that would trigger tagging N's content with only author restricts. Further, in this example, the search index has not refreshed since M and N were first connected. Accordingly, at this point, content authored by entity N does not include entity M's searcher restrict. Therefore, if entity M were to do a search, entity M would not identify entity N's content, even though M and N are now connected.

The foregoing situation is addressed by issuing (702) the author restrict. In the above example, process 700 issues (702) entity N's author restrict to entity M, along with an appropriate instruction to incorporate, into entity M's search queries, entity N's author restrict for at least a predefined period of time. The predefined period of time may be until the search index refreshes, at which time entity M's searcher restricts will be tagged to content authored by entity N. This predefined period of time may be the maximum time between index refreshes in order to ensure that entity M is not searching using entity N's author restrict longer than is necessary.

Process 700 refreshes (703) the search index, e.g., according to process 500 of FIG. 5. The refreshed index reflects the connection between entity M and N. Appropriate author and searcher restricts are issued to entities whose social graphs are known (e.g., members of a social networking service). In the above example, entity M is issued (704) entity M's searcher restrict, but not the author restrict for entity N (since entity N is not among the entities who has more than the threshold number of followers). However, because the connection between entities M and N is now reflected in the search index, entity M can search for content authored by entity N using entity N's searcher restrict.

In the context of the processes described herein, electronic content that can be accessed by a searcher can be tagged with appropriate restricts. For example, Web pages blog posts, messages (e-mail, text, microblog or other posts), comments, images, video, audio, and more can be tagged.

Figure 8:
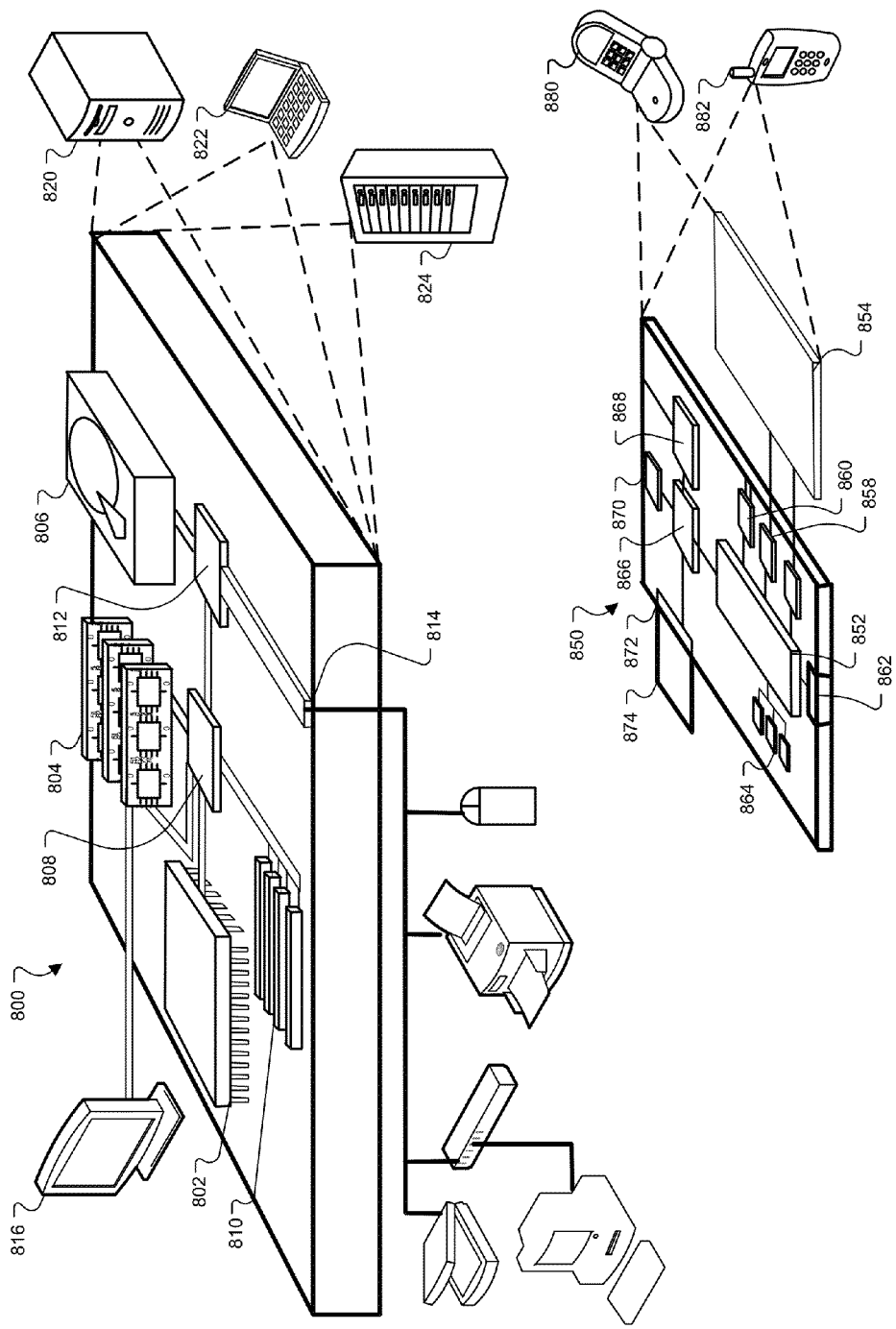
FIG. 8 shows examples of computing devices on which the processes described herein, or portions thereof, may be implemented.

FIG. 8 shows examples of computing devices on which the processes described herein, or portions thereof, may be implemented. FIG. 8 shows an example of a generic computing device 800 and a generic mobile computing device 850, which may be used to implement the processes described herein or portions thereof. For example, search component 312 may be implemented on computing device 800. Mobile computing device 850 may represent a client device of FIG. 2. Other client devices of FIG. 2 may also have the architecture of computing device 800.

Computing device 800 is intended to represent various forms of digital computers, examples of which include laptops, desktops, workstations, personal digital assistants, servers, blade servers, mainframes, and other appropriate computers. Computing device 850 is intended to represent various forms of mobile devices, examples of which include personal digital assistants, cellular telephones, smartphones, and other similar computing devices. The components shown here, their connections and relationships, and their functions, are meant to be exemplary only, and are not meant to limit implementations of the technology described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, for example, display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, examples of which include a magnetic or optical disk.

The storage device 806 is capable of providing mass storage for the computing device 800. In one implementation, the storage device 806 may be or contain a computer-readable medium, examples of which include a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, including those described above. The information carrier may be a non-transitory computer- or machine-readable medium, for example, the memory 804, the storage device 806, or memory on processor 802. For example, the information carrier may be a non-transitory, machine-readable storage medium.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, e.g., a keyboard, a pointing device, a scanner, or a networking device, e.g., a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer, e.g., a laptop computer 822. Alternatively, components from computing device 800 may be combined with other components in a mobile device (not shown), e.g., device 850. Each of such devices may contain one or more of computing device 800, 850, and an entire system may be made up of multiple computing devices 800, 850 communicating with each other.

Computing device 850 includes a processor 852, memory 864, an input/output device, e.g. a display 854, a communication interface 866, and a transceiver 868, among other components. The device 850 may also be provided with a storage device, e.g., a microdrive or other device, to provide additional storage. Each of the components 850, 852, 864, 854, 866, and 868, are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, e.g., control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided by the SIMM cards, along with additional information, e.g., placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, including those described above. The information carrier is a computer- or machine-readable medium, e.g., the memory 864, expansion memory 874, memory on processor 852, or a propagated signal that may be received, for example, over transceiver 868 or external interface 862.

Device 850 may communicate wirelessly through communication interface 866, which may include digital signal processing circuitry where necessary. Communication interface 866 may provide for communications under various modes or protocols, examples of which include GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, e.g., using a Bluetooth, Wi-Fi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, e.g., through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to a computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to a signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be a form of sensory feedback (e.g., visual feedback, auditory feedback, or tactile feedback); and input from the user can be received in a form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or a combination of such back end, middleware, or front end components. The components of the system can be interconnected by a form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In some implementations, the engine described herein can be separated, combined or incorporated into a single or combined engine. The engines depicted in the figures are not intended to limit the systems described herein to the software architectures shown therein.

For situations in which the systems and techniques discussed herein collect personal information about users, the users may be provided with an opportunity to enable/disable programs or features that may collect personal information (e.g., information about a user's preferences or a user's current location). In addition, certain data may be anonymized in one or more ways before it is stored or used, so that personally identifiable information is removed. For example, a user's identity may be anonymized so that no personally identifiable information can be determined for the use, or a user's geographic location may be generalized where location information is obtained (e.g., to a city, zip code, or state level), so that a particular location of the user cannot be determined.

In some implementations, the engines described herein can be separated, combined or incorporated into a single or combined engine. The engines depicted in the figures are not intended to limit the systems described here to the software architectures shown in the figures.

Elements of different implementations described herein may be combined to form other implementations not specifically set forth above. Elements may be left out of the processes, computer programs, Web pages, etc. described herein without adversely affecting their operation. In addition, the logic flows depicted in the figures do not require the particular order shown, or sequential order, to achieve desirable results. Various separate elements may be combined into one or more individual elements to perform the functions described herein.

All processes described herein and variations thereof (referred to as "the processes") contain functionality to ensure that party privacy is protected. To this end, the processes may be programmed to confirm that a user's membership in a social networking account is publicly known before divulging, to another party, that the user is a member. Likewise, the processes may be programmed to confirm that information about a party is publicly known before divulging that information to another party, or even before incorporating that information into a social graph.

In the context of this disclosure, the terms social network and social networking service may be used interchangeably.

Other implementations not specifically described herein are also within the scope of the following claims.

What is claimed is:

1. A method performed by one or more processing devices, comprising:
    comparing, for each entity of a plurality of entities, a number of connections associated with the entity, in one or more corresponding social graphs, to a threshold number of connections to other entities;
    based on the comparison, identifying one or more first entities of the plurality of entities that are associated with a number of connections greater than the threshold number of connections to other entities, and in response:
        identifying first content items in a search index that are authored by the one or more first entities, and
        associating, for each first content item, a respective author restrict with the first content item, the author restrict comprising data identifying the respective entity that authored the first content item;
    based on the comparison, identifying one or more second entities of the plurality of entities that are associated with a number of connections less than the threshold number of connections to the other entities, and in response:
        identifying second content items in the search index that are authored by the one or more second entities, and
        associating, for each second content item, one or more searcher restricts with the second content item, each searcher restrict of the one or more searcher restricts comprising data that identifies an other entity of a subset of the one or more other entities that are social connected to the second entity that authored the second content item, wherein the first content items are not associated with any searcher restricts;
    updating the search index to include the respective author restricts associated with each first content item and the respective one or more searcher restricts associated with each second content item; and
    storing the updated search index in memory.

2. The method of claim 1, further comprising associating, for at least some of the second content items, a respective author restrict with the second content item.

3. The method of claim 1, further comprising:
    identifying a newly-created association between two entities of the plurality of entities, a first entity of the two entities authoring a third content item that is associated with an author restrict comprising data that identifies the first entity; and
    issuing, to a second entity of the two entities, the author restrict comprising data that identifies the first entity.

4. The method of claim 3, further comprising:
    updating the search index to associate a searcher restrict comprising data identifying the second entity of the two entities with content authored by the first entity of the two entities.

5. The method of claim 4, wherein the author restrict comprising data that identifies the first entity of the two entities is used in searching for a predefined period of time.

6. The method of claim 5, wherein, at maximum, the predefined period of time is a time between updates of the search index.

7. The method of claim 1, further comprising:
    obtaining a search query comprising an author restrict and a searcher restrict;
    matching the author restrict to a corresponding author restrict associated with content in the search index, and matching the searcher restrict to a corresponding searcher restrict associated with content in the search index; and
    retrieving, from the search index, content in the search index that is associated with the corresponding author restrict, and content in the search index that is associated with the searcher restrict.

8. The method of claim 1, further comprising:
    updating the search index periodically to incorporate, into the search index, content that has been identified since the search index was last updated, the content that has been identified since the search index was last updated being associated with searcher restricts.

9. One or more non-transitory machine-readable media storing instructions that are executable by one or more processing devices to perform operations comprising:
    comparing, for each entity of a plurality of entities, a number of connections associated with the entity, in one or more corresponding social graphs, to a threshold number of connections to other entities;
    based on the comparison, identifying one or more first entities of the plurality of entities that are associated with a number of connections greater than the threshold number of connections to other entities, and in response:
        identifying first content items in a search index that are authored by the one or more first entities, and
        associating, for each first content item, a respective author restrict with the first content item, the author restrict comprising data identifying the respective entity that authored the first content item;
    based on the comparison, identifying one or more second entities of the plurality of entities that are associated with a number of connections less than the threshold number of connections to other entities, and in response:

identifying second content items in the search index that are authored by he one or more second items, and associating, for each second content item, one or more searcher restricts with the second content item, each searcher restrict of the one or more searcher restricts comprising data that identifies an other entity of a subset of the one or more other entities that are social connected to the second entity that authored the second content item, wherein the first content items are not associated with any searcher restricts;

updating the search index to include the respective author restricts associated with each first content item and the respective one or more searcher restricts associated with each second content item; and storing the updated search index in memory.

10. The one or more non-transitory machine-readable media of claim 9, wherein the operations comprise associating, for at least some of the second content items, a respective author restrict with the second content item.

11. The one or more non-transitory machine-readable media of claim 9, wherein the operations comprise:
identifying a newly-created association between two entities of the plurality of entities, a first entity of the two entities being authoring a third content item that is associated with an author restrict comprising data that identifies the first entity; and
issuing, to a second entity of the two entities, the author restrict comprising data that identifies the first entity for the first of the two entities.

12. The one or more non-transitory machine-readable media of claim 10, wherein the operations comprise:
updating the search index to associate a searcher restrict comprising data identifying the second entity of the two entities with content authored by the first entity of the two entities.

13. The one or more non-transitory machine-readable media of claim 12, wherein the author restrict comprising data that identifies the first entity of the two entities is used in searching for a predefined period of time.

14. The one or more non-transitory machine-readable media of claim 13, wherein, at maximum, the predefined period of time is a time between updates of the search index.

15. The one or more non-transitory machine-readable media of claim 9, wherein the operations comprise:
obtaining a search query comprising an author restrict and a searcher restrict;
matching the author restrict to a corresponding author restrict associated with content in the search index, and matching the searcher restrict to a corresponding searcher restrict associated with content in the search index; and
retrieving, from the search index, content in the search index that is associated with the corresponding author restrict, and content in the search index that is associated with the searcher restrict.

16. The one or more non-transitory machine-readable media of claim 9, wherein the operations comprise:
updating the search index periodically to incorporate, into the search index, content that has been identified since the search index was last updated, the content that has been identified since the search index was last updated being associated with searcher restricts.

17. A system comprising:
an indexing engine for performing operations comprising:
comparing, for each entity of a plurality of entities, a number of connections associated with the entity, in one or more corresponding social graphs, to a threshold number of connections to other entities;
based on the comparison, identifying one or more first entities of the plurality of entities that are associated with a number of connections greater than the threshold number of connections to other entities, and in response:
identifying first content items in a search index that are authored by the one or more first entities, and
associating, for each first content item, a respective author restrict with the first content item, the author restrict comprising data identifying the respective entity that authored the first content item;
based on the comparison, identifying one or more second entities of the plurality of entities that are associated with a number of connections less than the threshold number of connections to the other entities, and in response:
identifying second content items in the search index that are authored by the one or more second entities, and
associating, for each second content item, one or more searcher restricts with the second content item, each searcher restrict of the one or more searcher restricts comprising data that identifies an other entity of a subset of the one or more other entities that are social connected to the second entity that authored the second content item, wherein the first content items are not associated with any searcher restricts;
memory storing an updated search index to include the respective author restricts associated with each first content item and the respective one or more searcher restricts associated with each second content item.

18. The system of claim 17, wherein the operations comprise associating, for at least some of the second content items, a respective author restrict with the second content item.

19. The system of claim 17, wherein the operations comprise:
identifying a newly-created association between two entities of the plurality of entities, a first entity of the two entities authoring a third content item that is associated with an author restrict comprising data that identifies the first entity; and
issuing, to a second entity of the two entities, the author restrict comprising data that identifies the first entity.

20. The system of claim 19, wherein the operations comprise:
updating the search index to associate a searcher restrict comprising data identifying the second entity of the two entities with content authored by the first entity of the two entities.

* * * * *